United States Patent
Makita

(10) Patent No.: US 10,209,481 B2
(45) Date of Patent: Feb. 19, 2019

(54) LENS APPARATUS AND IMAGE PICKUP APPARATUS HAVING LENS APPARATUS

(71) Applicant: CANON KABUSHIKI KAISHA, Tokyo (JP)

(72) Inventor: Keisuke Makita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 15/370,595

(22) Filed: Dec. 6, 2016

(65) Prior Publication Data

US 2017/0176708 A1 Jun. 22, 2017

(30) Foreign Application Priority Data

Dec. 18, 2015 (JP) .................................. 2015-247150

(51) Int. Cl.
*G02B 7/02* (2006.01)
*G02B 7/08* (2006.01)
*G02B 7/10* (2006.01)
*G03B 3/10* (2006.01)

(52) U.S. Cl.
CPC .............. *G02B 7/08* (2013.01); *G02B 7/102* (2013.01); *G03B 3/10* (2013.01)

(58) Field of Classification Search
CPC ... G02B 7/08; G02B 7/09; G02B 7/04; G02B 3/10; H04N 5/2254
USPC .................................................. 359/811–830
See application file for complete search history.

(56) References Cited

U.S. PATENT DOCUMENTS

| 5,450,161 A | 9/1995 | Ichinose |
| 9,549,115 B1* | 1/2017 | Baldwin ............ H04N 5/23212 |
| 2004/0114251 A1 | 6/2004 | Kaneda et al. |
| 2009/0268075 A1* | 10/2009 | Yumiki .................. G03B 7/095 |
| | | 348/333.05 |
| 2015/0323760 A1* | 11/2015 | Tomosada ................ G02B 7/28 |
| | | 250/201.2 |

(Continued)

FOREIGN PATENT DOCUMENTS

| EP | 0503572 A2 | 9/1992 |
| JP | 2009106043 A | 5/2009 |
| JP | 2013172606 A | 9/2013 |

(Continued)

OTHER PUBLICATIONS

Extended European Search Report issued in European Patent Application No. 16002603.5 dated May 3, 2017.

*Primary Examiner* — William R Alexander
*Assistant Examiner* — Tamara Y. Washington
(74) *Attorney, Agent, or Firm* — Rossi, Kimms & McDowell LLP

(57) ABSTRACT

A lens apparatus comprises an optical system including a focus lens, a vibrating motor for driving the focus lens in an optical axis direction, a detector for detecting a position of the focus lens in the optical axis direction, an operating unit for inputting a position instruction for the focus lens, and a controller for, on the basis of the position instruction and a state of the optical system, switching between a case of controlling the motor by using an instruction value which is obtained on the basis of the position of the focus lens obtained from the detector and the position instruction obtained from the operating unit and a case of not controlling the motor by using the instruction value.

3 Claims, 7 Drawing Sheets

(56) References Cited

U.S. PATENT DOCUMENTS

2016/0258758 A1\* 9/2016 Houston ................ G01C 21/20
2017/0108528 A1\* 4/2017 Atlas ..................... G01P 13/025

FOREIGN PATENT DOCUMENTS

JP 2014202868 A 10/2014
JP 2014235226 A 12/2014

\* cited by examiner

FIG. 2

| DETECTION POSITION | ABSOLUTE POSITION (OBJECT DISTANCE/mm) |
|---|---|
| 0 | 850 |
| 1 | 858 |
| 2 | 870 |
| 3 | 882 |
| 4 | 895 |
| ⋮ | |
| 35 | 1745 |
| 36 | 1819 |
| 37 | 1900 |
| 38 | 1990 |
| 39 | 2091 |
| ⋮ | |

LENS APPARATUS AND IMAGE PICKUP APPARATUS HAVING LENS APPARATUS

BACKGROUND OF THE INVENTION

Field of the Invention

The present invention relates to a lens apparatus. In particular, the present invention relates to the lens apparatus which controls driving of a focus lens by a vibrating motor, and to an image pickup apparatus which has the lens apparatus.

Description of the Related Art

As for a lens apparatus used in photography, videography and the like, the type which adopts a vibrating motor as an actuator for a focus lens is known. The feature of the vibrating motor is different from the feature of a magnetic motor in the points of being able to obtain large torque even in low-speed rotation, having high holding force during a stop of the motor, being unaffected by magnetism, and the like.

The vibrating motor is constituted by a vibrating body which is formed by a metallic elastic member having a mechanical-electrical energy convertor (piezoelectric device, electrostrictive element) joined or the like, and a contact body which is in contact with the vibrating body. The vibrating body and the contact body are in pressure contact with each other so as to generate frictional force therebetween. When applying a plurality of frequency signals respectively having phase differences to the piezoelectric device, the vibrating body is vibrated, and driving force is generated by relative movement of the vibrating body and the contact body. For this reason, it has been known that, when the vibrating motor is driven, wear is caused at the contact portion between the vibrating body and the contact body, thereby causing performance deterioration. To reduce the suchlike wear accompanied by the driving of the vibrating motor, Japanese Patent Application Laid-Open No. 2009-106043 discloses the technique of reducing the wear by gradually increasing or decreasing the voltage magnitude applied to a surface acoustic wave actuator when accelerating or decelerating the actuator, and thus aiming to prolong the lifetime.

However, although the technique disclosed in Japanese Patent Application Laid-Open No. 2009-106043 is effective when driving the actuator at constant speed, it takes time to reach the desired speed. For this reason, when the driving speed of the actuator frequently changes, speed responsiveness of the actuator significantly deteriorates.

As described above, the vibrating motor is worn out when it is driven. Therefore, when a lot of driving instructions are given in a short time, namely, when the driving instruction is given frequently, the vibrating motor is resultingly driven frequently, whereby the motor is liable to wear.

Incidentally, an instructing device (demand) for instructing driving of a focus lens is connected to a broadcasting interchangeable lens. Thus, it is possible to instruct the driving of the focus lens by an operation of the demand by a photographer (or videographer). Here, the demand, which has a rotation member to be operated by the photographer, is constituted such that the rotation quantity (demand operation quantity) of the rotation member can be detected by a potentiometer or the like. The interchangeable lens gives the driving instruction to the actuator in accordance with the demand operation quantity of the connected demand. In general, the detection of the demand operation quantity is subjected to sampling at a predetermined period, and the instruction value is output to the actuator at the predetermined period.

For this reason, in the case where the actuator is constituted by the vibrating motor, when the driving of the focus lens is instructed by the demand, the driving instruction is frequently given according to the predetermined period as described above, whereby the vibrating motor is liable to wear. To cope with such inconvenience, it only has to prolong the period at which the demand operation quantity is obtained or the period at which the instruction value is output. However, when such a countermeasure is actually implemented, there is a possibility of bringing a feeling of strangeness in the operation because driving responsiveness of the focus lens to the operation of the demand (a change of a photographed image) deteriorates.

SUMMARY OF THE INVENTION

An object of the present invention is to provide a lens apparatus which enables to reduce a feeling of strangeness to an operation while reducing wear caused in driving of a vibrating motor.

To achieve the above object, a lens apparatus according to the present invention comprises: an optical system including a focus lens; a vibrating motor that drives the focus lens in an optical axis direction; a detector that detects a position of the focus lens in the optical axis direction; an operating unit that inputs a position instruction for the focus lens; and a controller that, on the basis of the position instruction and a state of the optical system, switches between a case of controlling the motor by using an instruction value which is obtained on the basis of the position of the focus lens obtained from the detector and the position instruction obtained from the operating unit and a case of not controlling the motor by using the instruction value.

According to the present invention, it is possible to provide the lens apparatus which enables to reduce the feeling of strangeness to the operation while reducing the wear caused in the driving of the vibrating motor.

Further features of the present invention will become apparent from the following description of exemplary embodiments with reference to the attached drawings.

BRIEF DESCRIPTION OF THE DRAWINGS

FIG. 2 is a diagram showing an example of table data to be used for obtaining absolute positions.

DESCRIPTION OF THE EMBODIMENTS

Preferred embodiments of the present invention will now be described in detail in accordance with the accompanying drawings.

Embodiment 1

Figure 1:
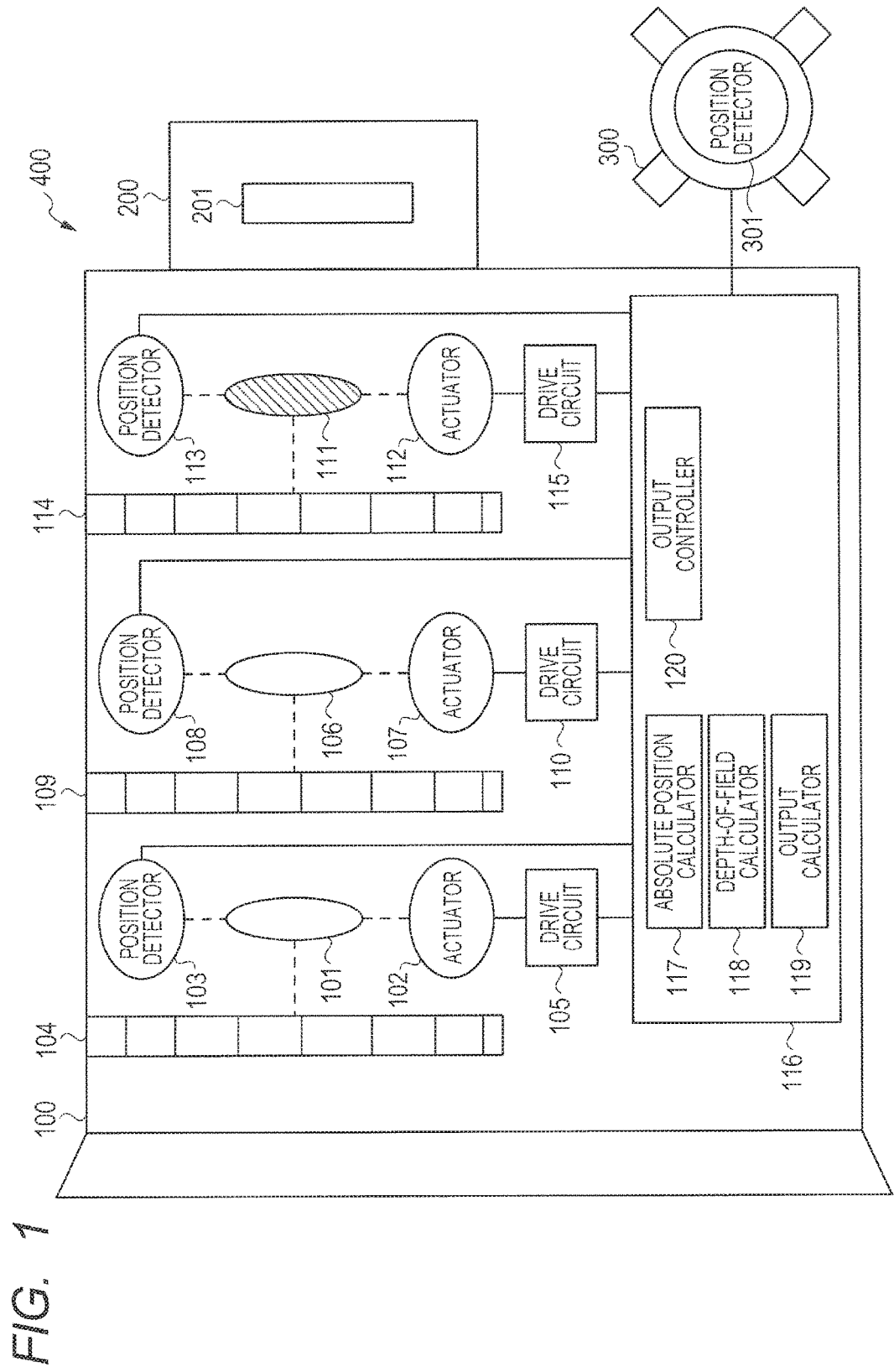
FIG. 1 is a block diagram for illustrating the constitution according to the embodiment 1 of the present invention.

Hereinafter, a photographing system 400 according to the embodiment 1 of the present invention will be described with reference to FIG. 1. The photographing system 400 is constituted by a lens apparatus 100, an image pickup apparatus 200 and an operating apparatus 300. The image pickup apparatus 200 having an image pickup element 201 is connected to the lens apparatus 100, so that the image pickup apparatus receives light from the lens apparatus 100 by the image pickup element 201 and photoelectrically converts the received light. Besides, the operating apparatus 300 is connected to the lens apparatus 100.

Hereinafter, the constitution of the lens apparatus 100 will be described. The lens apparatus 100 is constituted by an optical system having optical adjusting members such as a focus lens 101, a zoom lens 106 and a stop 111. Each of the optical adjusting members comprises an actuator, a position detector and an operating unit. The focus lens 101 is the member for displacing the imaging position of the lens apparatus 100 by moving in the optical axis direction. The zoom lens 106 is the member for displacing the focal distance of the lens apparatus 100 by moving in the optical axis direction. The stop 111 is the member for adjusting a light quantity of the lens apparatus 100. The actuator (driving unit) 102 drives the focus lens 101. In the present embodiment, a vibrating motor is assumed to be used for the actuator. A drive circuit 105 drives the actuator 102 based on a signal from a later-described CPU 116. A position detector (detecting unit) 103, which is, e.g. an encoder, is connected to the focus lens 101 via a gear, and generates a pulse according to the movement quantity of the focus lens 101. The generated pulses are counted by a not-illustrated counter, whereby the position of the focus lens 101 is calculated. This calculation is performed at a predetermined period (sampling period). Likewise, a position detector 108 detects the position of the zoom lens 106, and a position detector 113 detects the position of the stop 111. An operating unit 104, which is constituted by, e.g. an operation ring or the like, can transfer the rotation force of the ring to the focus lens 101 without driving the actuator 102, thereby enabling to displace the focus lens in the optical axis direction. Likewise, an operating unit 109 displaces the zoom lens 106 in the optical axis direction, and an operating unit 114 changes the aperture diameter of the stop 111. An actuator 107 drives the zoom lens 106, and an actuator 112 drives the stop 111. Although a stepping motor is used as each of the actuators 107 and 112 in the present embodiment, the present invention is not limited to this. Drive circuits 110 and 115 respectively drive the actuators 107 and 112 based on signals from the later-described CPU 116. The CPU 116 is constituted by an absolute position calculator 117, a depth-of-field calculator 118, an output calculator 119 and an output controller 120.

The absolute position calculator 117 converts the position of the focus lens 101 detected by the position detector 103 and calculated by the CPU 116, into an absolute position. As the converting method, for example, it only has to store the table data as illustrated in FIG. in a not-illustrated memory, and then refer to the absolute position corresponding to the detection position in accordance with the stored table data. For example, the absolute position (object distance) is converted into "895 mm" when the detection position is "4", and the absolute position (object distance) is converted into "1990 mm" when the detection position is "38". The similar table data is held for each of the zoom lens 106 and the stop 111, and the detection positions detected by the respective position detectors 108 and 113 are thus converted into the absolute positions. Incidentally, the constitution of the absolute position calculator 117 is not limited to that described above. It may be possible to use a method of holding a conversion expression for converting the detection position into the absolute position in a not-illustrated memory and performing calculation based on the detection position by using the held expression. Incidentally, the object distance here is equivalent to the distance from the main plane of the lens apparatus 100 to a subject.

To return to FIG. 1, the depth-of-field calculator (controller) 118 calculates the depth of field of the photographing system 400. Here, if it is assumed that the object distance is L, the lens focal distance is f, an F number is $F_{NO}$ and (the diameter of) a permissible circle of confusion is δ, the depth of field d can be calculated by the following expressions (1) to (3).

$$\text{rear depth of field } d_1 = \delta \times F_{NO} \times L^2/f^2 - \delta \times F_{NO} \times L \quad (1)$$

$$\text{front depth of field } d_2 = \delta \times F_{NO} \times L^2/f^2 + \delta \times F_{NO} \times L \quad (2)$$

$$\text{depth of field } d = d_1 + d_2 \quad (3)$$

The permissible circle of confusion δ is determined by the image pickup element 201, and the object distance L, the focal distance f and the F number $F_{NO}$ can be calculated by the above-described absolute position calculator 117, whereby the depth of field d can be calculated by the depth-of-field calculator 118. Here, as (the diameter of) the permissible circle of confusion δ, it is desirable to use a value of 1 time or more and 5 times or less of the pixel pitch (the distance between the centers of the pixels, or the width, the height of the pixel) of the image pickup element 201 (more preferably, 1.5 times or more and 3 times or less, e.g. 1.5 times, 2 times or 3 times). Although (the diameter of) the permissible circle of confusion δ may previously be stored in the lens apparatus 100, the present invention is not limited to this. Namely, it may be possible to use a method of obtaining the permissible circle of confusion by communication between the lens apparatus 100 and the image pickup apparatus 200. Incidentally, the numerical value of the depth of field in the following description has been converted into the value of the dimension same as that of the position of the focus lens 101 detected by the position detector 103.

The details of the output calculator (controller) 119 and the output controller (controller) 120 will be described later.

Hereinafter, the operating apparatus 300 will be described. The operating apparatus 300 is used by a photographer to instruct driving of the focus lens 101. The operating apparatus 300 comprises a not-illustrated rotation member operated by the photographer, and the rotation position of the rotation member is detected by a position detector 301. For example, a potentiometer is used as the position detector 301. The rotation position of the rotation member is detected by the potentiometer, the detected rotation position is converted into a digital signal via a not-illustrated A/D converter, and the obtained digital signal is input to the CPU 116. This operation is performed at the predetermined period (sampling period). In the CPU 116, a position instruction of the focus lens 101 is calculated based on the detected position of the rotation member. Incidentally, the numerical value of an instruction position (position instruction) input from the operating apparatus 300 in the following description has been converted into the value of the dimension same as that of the position of the focus lens 101 detected by the position detector 103.

By the photographing system 400 like this, it is possible for the photographer to photograph a subject while changing the photographic angle of view, the focus and the light quantity of the subject.

Hereinafter, the output calculator 119 will be described. The output calculator 119 calculates (derives) an output value (instruction value) for each of driving the focus lens 101, the zoom lens 106 and the stop 111. For example, as for the focus lens 101, the output value is calculated based on a difference between the position (hereinafter, Fol) of the focus lens 101 detected by the position detector 103 and the instruction position (hereinafter, Ctl) input from the operating apparatus 300. As described above, Fol and Ctl are detected at the predetermined sampling period.

Hereinafter, the output controller 120 will be described. The output controller 120 controls whether or not to output the output value calculated by the output calculator 119 to the drive circuit 105. Hereinafter, the control flow of the output controller 120 will be described with reference to FIG. 3. Initially, the process of the CPU 116 is advanced to step S301 to obtain the depth of field d calculated by the depth-of-field calculator 118, and calculate a threshold A. The threshold A is obtained by multiplying the depth of field d by a coefficient k (50%) being a predetermined percentage, and the coefficient k is a fixed value previously set. Here, it is desirable to set the coefficient k to 10% or more and 90% or less (0.1 or more and 0.9 or less), and, more preferably to 30% or more and 70% or less (0.3 or more and 0.7 or less). Next, in step S302, the CPU obtains Fol and Ctl, and the process is advanced to step S303. In step S303, the CPU calculates the difference between Fol and Ctl obtained. When the absolute value of the calculated difference (hereinafter, the difference) is equal to or larger than the threshold A determined based on the depth of field (that is, equal to or larger than the value obtained by multiplying the depth of field by the predetermined percentage), the process is returned to step S301. When not (that is, smaller than the threshold A (smaller than the value obtained by multiplying the depth of field by the predetermined percentage)), the process is advanced to step S304. In step S304, the CPU obtains the output value calculated by the output calculator 119, and the process is advanced to step S305. In step S305, the CPU outputs the output value obtained in step S304 to the drive circuit 105, thereby driving the focus lens 101. In step S306, the process is returned to step S304 until the driving of the focus lens 101 is ended and the lens is stopped. When the focus lens 101 is stopped, the process is advanced to step S307 to stop the output to the drive circuit 105.

As just described, in the output controller 120, the output to the drive circuit 105 is performed only when the difference between Fol and Ctl exceeds the predetermined threshold.

Hereinafter, a difference between a case (FIG. 4) where the output to the drive circuit 105 is controlled by the output controller 120 and a case (FIG. 5) where the output to the drive circuit 105 is not controlled by the output controller 120 will be described with reference to FIGS. 4 and 5.

Figure 4A:
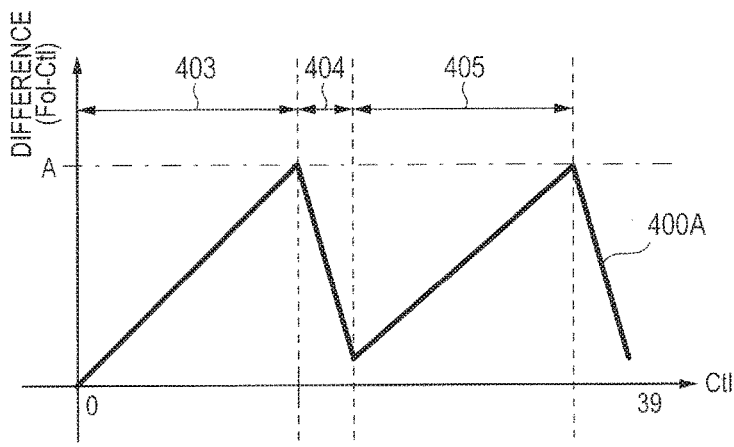
FIGS. 4(a), 4(b) and 4(c) are graphs for indicating the relation between the focus position and the output to the actuator, in regard to instructions when the output controller is active.
Figure 4B:
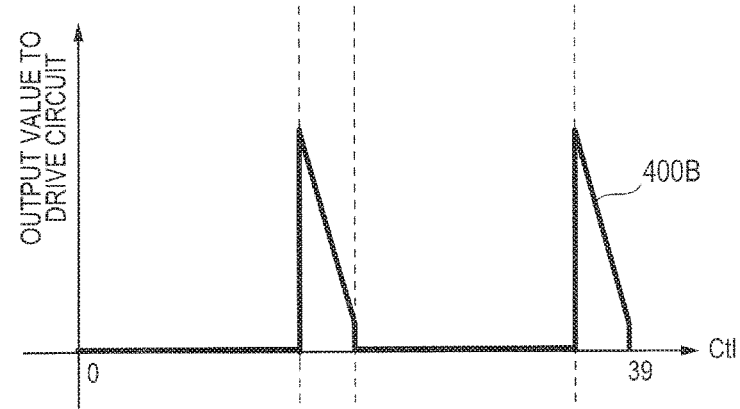
Figure 4C:
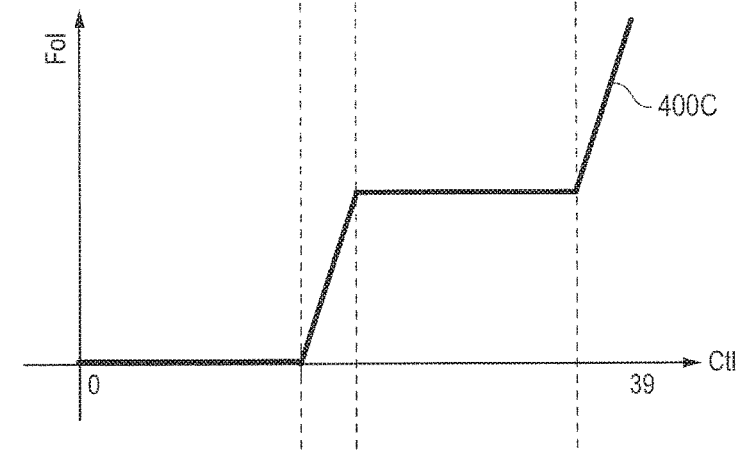

In (a) of FIG. 4, the horizontal axis indicates Ctl, and the vertical axis indicates the difference between Fol and Ctl. In (b) of FIG. 4, the horizontal axis indicates Ctl, and the vertical axis indicates the output value to the drive circuit 105. In (c) of FIG. 4, the horizontal axis indicates Ctl, and the vertical axis indicates Fol.

A solid line 400A indicates a change of the difference between Fol and Ctl to Ctl, a solid line 400B indicates a change of the output value to the drive circuit to Ctl, and a solid line 400C indicates a change of Fol to Ctl.

Figure 3:
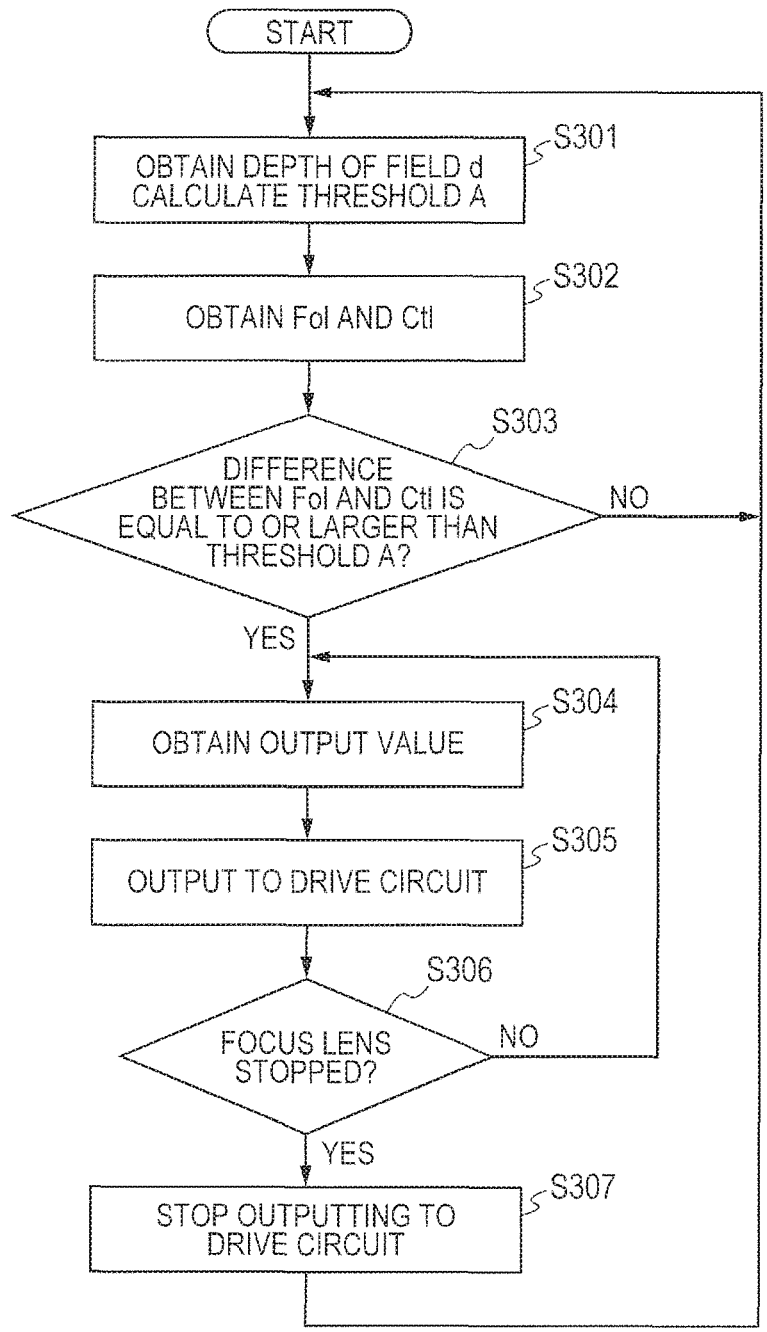
FIG. 3 is a flow chart for indicating the operation of an output controller according to the embodiment 1.

An interval 403 is the interval in which the output to the drive circuit 105 is limited, because the difference between Fol and Ctl is not equal to or larger than the threshold A (NO in step S303 of FIG. 3). In this interval, since Ctl exists within the depth of field d, a photographed image is not changed even when the focus lens 101 is driven.

An interval 404 is the interval in which the difference between Fol and Ctl is equal to or larger than the threshold A and the output value based on the difference between Fol and Ctl is output to the drive circuit 105 (YES in step S303 of FIG. 3, and processes in steps S304 to S306 are performed). In this interval, since the output to the drive circuit 105 is started, the focus lens 101 is driven, and Fol increases as illustrated in (c) of FIG. 4. It is assumed that the driving speed at this time is sufficiently higher than the speed at which the photographer displaces Ctl by operating the operating apparatus 300. For this reason, the difference between Fol and Ctl decreases as illustrated in (a) of FIG. 4, and also the output to the drive circuit 105 decreases as illustrated in (b) of FIG. 4. Then, when the output decreases up to a value insufficient to drive the focus lens 101 because of the decrease of the output to the drive circuit 105 according to the decrease of the difference between Fol and Ctl, the focus lens 101 is stopped although the difference between Fol and Ctl does not become "0". When the focus lens 101 is stopped, the output to the drive circuit 105 is stopped (YES in step S306 of FIG. 3).

In an interval 405, since the output to the drive circuit 105 is being stopped, the difference between Fol and Ctl again increases according to the operation speed of the operating apparatus 300. Then, when the difference exceeds the threshold A again, the output to the drive circuit 105 is performed.

As described above, only when the certain condition is satisfied the output to the drive circuit 105 with the output controller 120, the focus lens 101 is driven.

Subsequently, the case where the output to the drive circuit 105 is not controlled by the output controller 120 will be described with reference to FIG. 5.

Figure 5A:
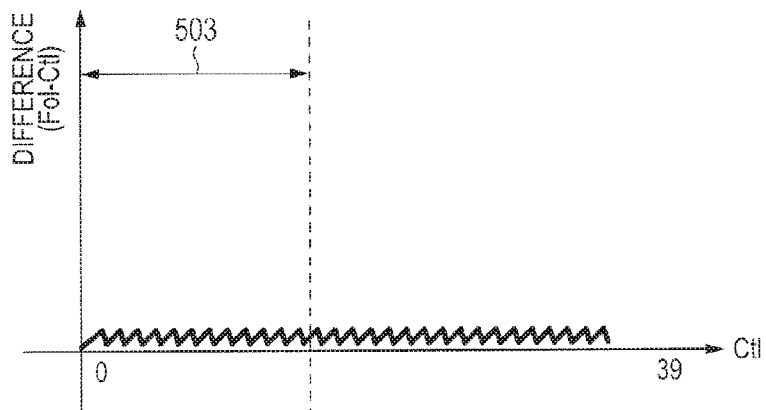
FIGS. 5(a), 5(b) and 5(c) are graphs for indicating the relation between the focus position and the output to the actuator, in regard to instructions when the output controller is inactive.
Figure 5B:
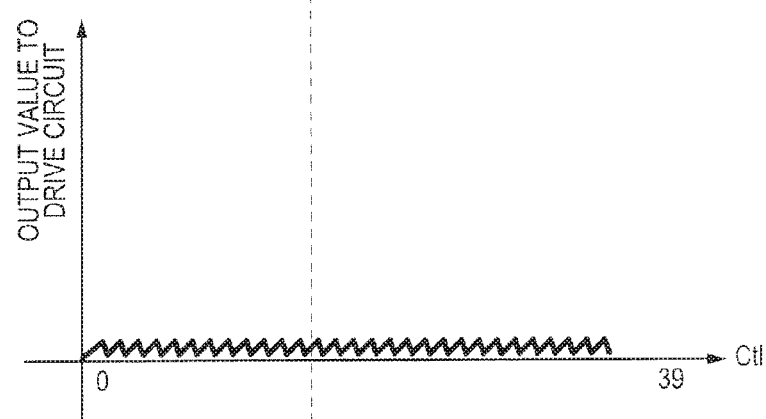
Figure 5C:
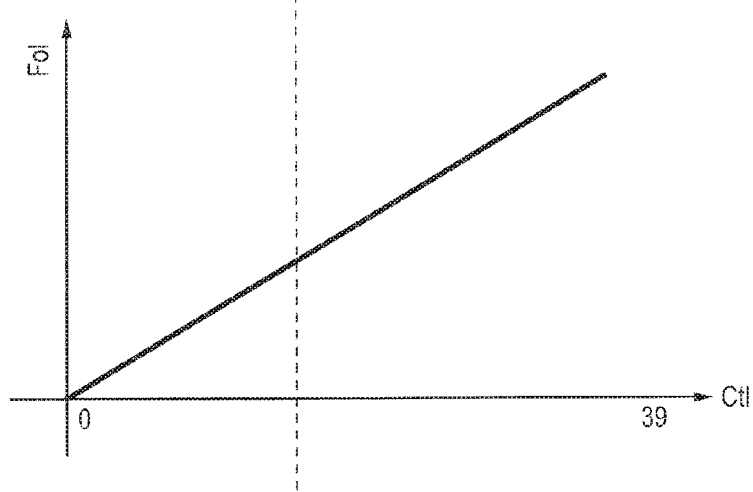

Since the horizontal axes and the vertical axes of (a), (b) and (c) of FIG. 5 are respectively equivalent to those of (a), (b) and (c) of FIG. 4, the descriptions thereof are omitted. Also, an interval 503 is equivalent to the interval 403 illustrated in FIG. 4. In FIG. 5, the output value to the drive circuit 105 is calculated and output according to the values of Fol and Ctl detected for each sampling period. It can be understood from (b) of FIG. 5 that the output to the drive circuit 105 is frequently performed, whereby the focus lens 101 is moved as illustrated in (c) of FIG. 5. As described above, in the interval 403, the photographed image is not changed even when the focus lens 101 is driven. However, in (c) of FIG. 5, it can be understood that the focus lens 101 is driven even in the interval 503.

As described, in the present embodiment, when the difference between Fol and Ctl exceeds the predetermined threshold, the output to the drive circuit 105 is performed, thereby driving the focus lens 101. Namely, even if Ctl is input by operating the operating apparatus 300, the actuator 102 is not driven as long as the difference between Fol and Ctl does not exceed the threshold. Consequently, since it is possible to reduce the frequency of the driving of the actuator, it is possible to reduce the wear caused when the actuator 102 is driven. In addition, since the threshold is set within the range of the depth of field, the driving of the actuator 102 is limited while the photographed image is not changed even when the focus lens 101 is driven (in the depth of field). Consequently, it is possible to reduce a feeling of strangeness to the operation of the focus lens 101.

Although the demand is used as the operating apparatus of the focus lens 101 in the present embodiment, the present invention is not limited to this. Namely, an electronic ring may be used. The electronic ring is mounted on a lens barrel, and the rotation force of the ring is not transmitted to a lens group. The rotation position of the ring is detected by the position detector or the like, and the instruction value according to the detected rotation position is given to the actuator, thereby driving the lens group.

Incidentally, it is also possible to apply a lens apparatus such as a publicly known inner-focus lens apparatus in which the focus lens group is driven according to the displacement of the zoom lens group.

Incidentally, it may be possible to have a constitution of, according to the depth of field, changing the control period or changing the resolution of the instruction value calculated inside the CPU.

Although the threshold of the difference between the current position of the focus lens and the instruction position is set to 50% of the depth of field d in the present embodiment, the present invention is not limited to this if the threshold has a value by which it is possible to reduce the wear of the actuator without bringing a feeling of strangeness in the operation of the focus lens.

Although the focus is exemplified as the optical adjusting member to be driven by the vibrating motor in the present embodiment, the optical adjusting member to be driven by the vibrating motor is not limited to this. Namely, it is possible to apply the control of the present invention also to a zoom or an iris as the target to be driven by the vibrating motor.

Embodiment 2

Hereinafter, the embodiment 2 of the present invention will be described with reference to FIGS. 6 to 7B.

In the embodiment 1, when the difference between the current position of the focus lens 101 and the instruction position exceeds the predetermined threshold A, the output to the drive circuit 105 is performed, thereby driving the focus lens 101. Further, when it is decided that the focus lens 101 is stopped, also the output to the drive circuit 105 is stopped. In the present embodiment, operation/no operation from the operating apparatus is decided. Then, when no operation is decided (that is, it is decided that the operating apparatus is not operated), the focus lens 101 is driven irrespective of whether or not the difference between the current position and the instruction position is equal to or larger than the threshold A.

The constitution of the photographing system 400 in the present embodiment is the same as that in the embodiment 1, the description thereof is omitted.

Hereinafter, the output controller 120 in the present embodiment will be described with reference to FIGS. 6, 7A and 7B.

Figure 6:
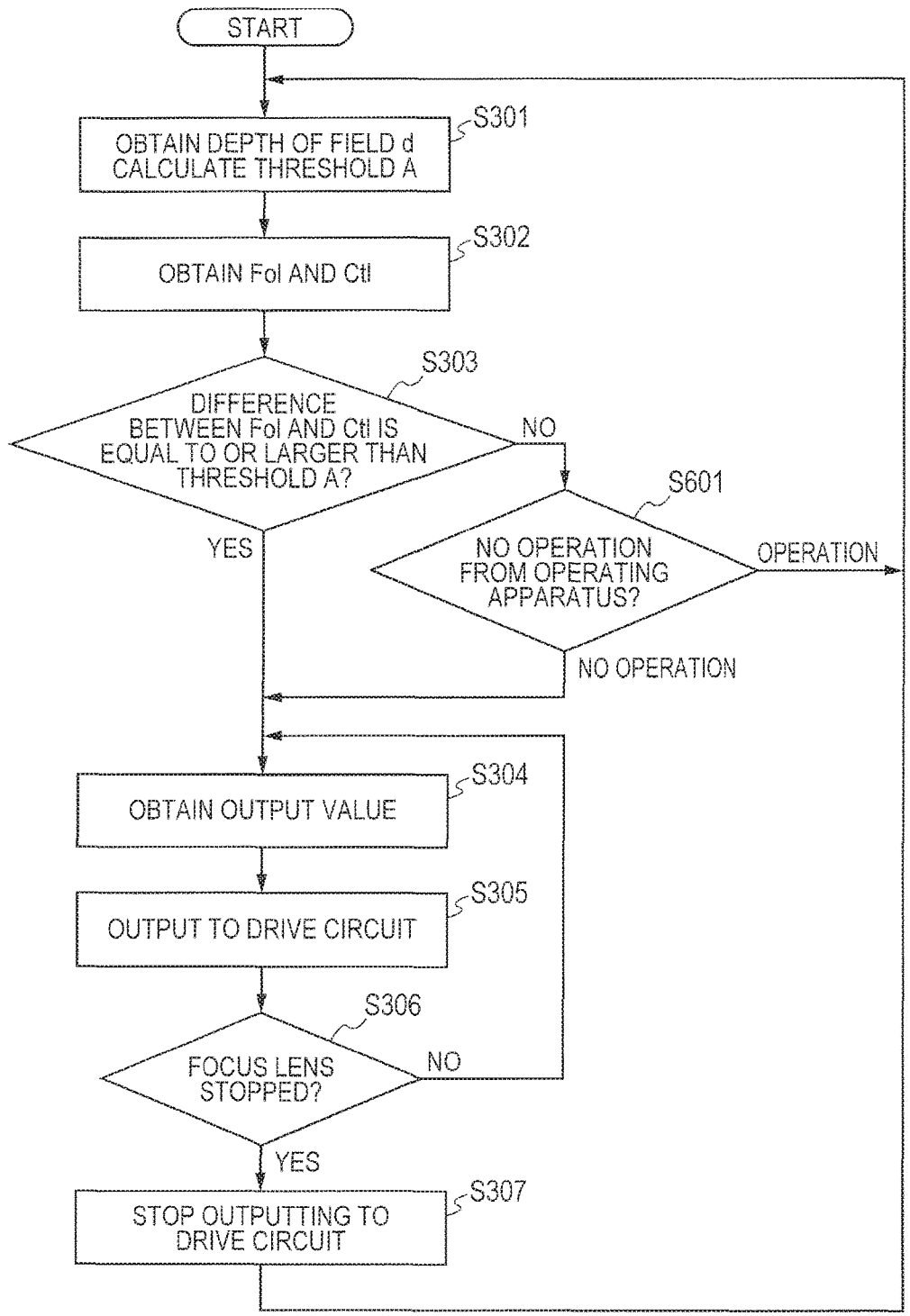
FIG. 6 is a flow chart for indicating the operation of the output controller according to the embodiment 2.

FIG. 6 is the flow chart for indicating the flow of the control performed by the output controller 120 according to the present embodiment. Incidentally, the processes same as those in the flow chart of the embodiment 1 are respectively indicated by the symbols same as those in FIG. 3, and the descriptions thereof are omitted.

When it is decided in step S601 that the operating apparatus 300 is not operated for a predetermined time or more, the process is advanced to step S304. On the other hand, when it is not decided so, the process is returned to step S301.

Figure 7A:
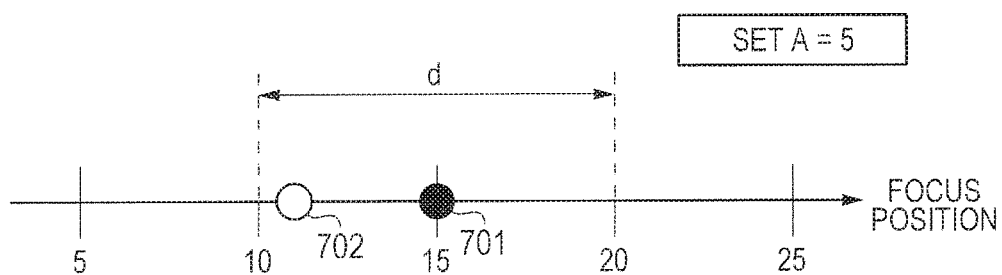
FIG. 7A is a diagram for indicating the relation between the focus position and the instruction according to the embodiment 2.
Figure 7B:
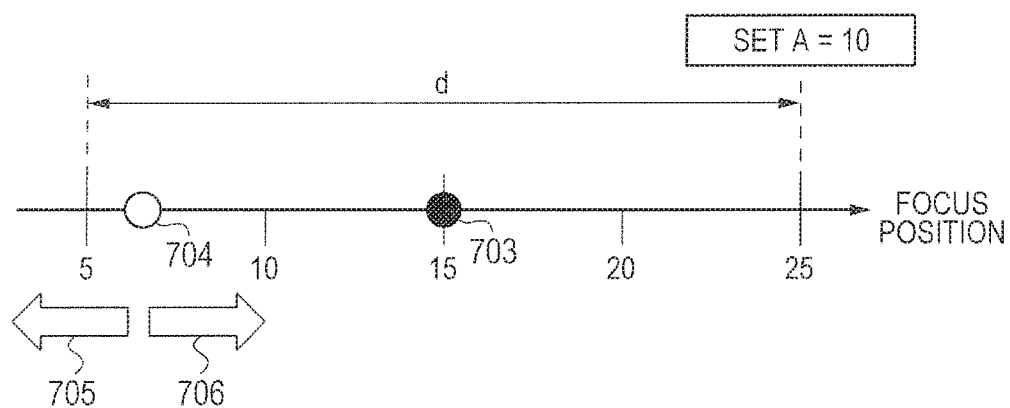
FIG. 7B is a diagram for indicating the relation between the focus position and the instruction according to the embodiment 2.

FIGS. 7A and 7B are the diagrams for indicating the relations between Fol and Ctl respectively in a case where the depth of field is narrow (FIG. 7A) and a case where the depth of field is wide (FIG. 7B). In FIGS. 7A and 7B, each of the horizontal axes indicates the position of the focus lens 101, each of black dots 701 and 703 indicates Fol, each of white dots 702 and 704 indicates Ctl, and d indicates the depth of field.

When the depth of field is wide, the focus lens 101 is not driven even when the difference of Fol and Ctl of the focus lens 101 is large, whereby the lens remains stopped (FIG. 7B). In this state, after then, the operation quantity until the focus lens 101 is driven is different between a case where the operating apparatus 300 is operated in the direction indicated by an arrow 705 and a case where the operating apparatus is operated in the direction indicated by an arrow 706, whereby an operator feels strange about the focusing operation.

In the present embodiment, when no operation from the operating apparatus is decided, since the focus lens is driven up to the instruction position, it is possible to reduce the difference between the operation quantities in the respective operation directions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-247150, filed Dec. 18, 2015, which is hereby incorporated by reference herein in its entirety.

What is claimed is:

1. A lens apparatus comprising:
   an optical system including a focus lens;
   a vibrating motor configured to drive the focus lens in an optical axis direction;
   a detector configured to detect a position of the focus lens in the optical axis direction;
   an operating unit configured to be operated by a user and input a position instruction for the focus lens; and
   a controller configured to output an instruction value for the motor, which is obtained based on the position of the focus lens obtained from the detector and the position instruction obtained from the operating unit, in a case where a difference between the position instruction and the position of the focus lens is not smaller than a threshold determined based on a depth of field obtained based on a state of the optical system,
   wherein the controller is configured to output, even in a case where the difference is smaller than the threshold, the instruction value for the motor in a case where the operating unit is not operated for a predetermined time or more.

2. The lens apparatus according to claim 1, wherein the threshold is obtained by multiplying the depth of field by a predetermined percentage, wherein the predetermined percentage is not less than 10% and not more than 90%.

3. An image pickup apparatus comprising:
a lens apparatus including:
   an optical system including a focus lens;
   a vibrating motor configured to drive the focus lens in an optical axis direction;
   a detector configured to detect a position of the focus lens in the optical axis direction;
   an operating unit configured to be operated by a user and input a position instruction for the focus lens; and
   a controller configured to output an instruction value for the motor, which is obtained based on the position of the focus lens obtained from the detector and the position instruction obtained from the operating unit, in a case where a difference between the position instruction and the position of the focus lens is not smaller than a threshold determined based on a depth of field obtained based on a state of the optical system,
   wherein the controller is configured to output, even in a case where the difference is smaller than the threshold, the instruction value for the motor in a case where the operating unit is not operated for a predetermined time or more; and
an image pickup element configured to receive light from the lens apparatus.

* * * * *